Aug. 9, 1960  M. U. ZIMMERMAN, JR  2,948,142
APPARATUS FOR IMPELLING OBJECTS WITHIN A PIPELINE
Filed May 17, 1957

INVENTOR.
MARLIN U. ZIMMERMAN, JR.
BY
ATTORNEY

United States Patent Office 2,948,142
Patented Aug. 9, 1960

2,948,142

APPARATUS FOR IMPELLING OBJECTS WITHIN A PIPELINE

Marlin U. Zimmerman, Jr., Shaker Heights, Ohio, assignor to The Standard Oil Company, Cleveland, Ohio, a corporation of Ohio Filed May 17, 1957, Ser. No. 659,848

3 Claims. (Cl. 73—3)

This invention relates to an apparatus for impelling objects within a pipeline and, more particularly, relates to an apparatus for repositioning a scraper or plug in a calibration loop at its starting point after completion of a calibration cycle.

There are numerous instances today in the petroleum and chemical process industries when it becomes advantageous to move an object within a pipeline without the necessity of opening the pipeline, removing the object, and readmitting it subsequently to a desired location at some other point in the pipeline. A typical example where an object must be moved within a pipe is in a calibration loop, which is an apparatus often utilized today to determine the accuracy of flow meters while said meters are functioning on pipeline streams.

An example of such a system is disclosed in U.S. Patent No. 2,772,561. Briefly described, these systems function by forcing with a liquid under pressure an object, hereinafter referred to as a "plug," which forms a movable seal inside the pipe through a length of piping that is formed into a loop. The liquid is diverted from the pipeline stream into the loop by an inlet line and a system of valves and forces the plug around the loop. A short distance downstream in the loop the plug trips a switch which closes an electrical circuit, thereby actuating a counter on the product flow meter under test and initiating a timing device. This electrical circuit remains closed while the plug continues the course of the loop until a position near the end of the loop when the plug trips a second switch which opens the electrical circuit deactuating the counter on the flow meter and stopping the timing device. Shortly downstream from this second switch, the liquid leaves the loop to re-enter the product stream by means of a discharge line from the loop and a series of valves. The plug comes to rest just beyond the discharge line due to the loss of liquid pressure. A calibration can then be made by a comparison between the flow meter reading and a calculated flow rate derived from the known volume within the pipe between the two switches and the time that was recorded for the plug to traverse the distance between the switches. Such a calibration loop can be provided with pressure gauges and temperature measuring devices to compare the conditions of the calibration run with average conditions on past determinations. Then a final meter adjustment can be made on the basis of known physical properties such as thermal expansion and compressibility of the liquid being measured.

One disadvantage, however, in utilizing such a calibration loop has been the inconvenience of repositioning the plug from the point where it comes to rest just beyond the loop discharge line to a position just forward of the loop inlet line to prepare the loop for another calibration determination.

Several methods are presently utilized for repositioning the plug, but all result in a costly use of time and labor. One method now in practice requires physically removing the plug from the line at the end of the loop and admitting it to the line at the start of the loop. With this method flanges or end plates must be removed manually, incurring labor costs and causing spillage of product. Such spillage results in loss of product value and detracts from good housekeeping in the plant. Furthermore, product spillage can be a source of possible hazards should the material be combustible or toxic.

Another known method for repositioning the plug involves moving the plug backwards through the loop of pipe by reversing the flow of the fluid. This method is not desirable since it unduly deteriorates a plug which must be especially designed and constructed to provide an adequate seal when traveling in the direction of measurement flow. In addition, this method requires a complicated system of valves which must be operated manually or the installation of costly equipment to drive the valves mechanically.

Still another method for repositioning plugs in a continuous loop requires opening and closing a plurality of valves to advance the plug to the starting position by liquid pressure. Again, such practice with valves positioned on large diameter lines involves excessive capital, labor, and maintenance costs.

It is a primary object of this invention to provide a novel method and apparatus for repositioning a calibrating plug after a completed calibration to the starting point for the plug in the loop. This method consists of imposing a magnetic force along a section of the pipe in the loop and, by said magnetic force, attracting and advancing the plug along said section of pipe to the starting position for another calibration run.

A more complete understanding of the invention and its advantages can be obtained from the following detailed description taken together with accompanying drawings in which.

Figures 1, 2:
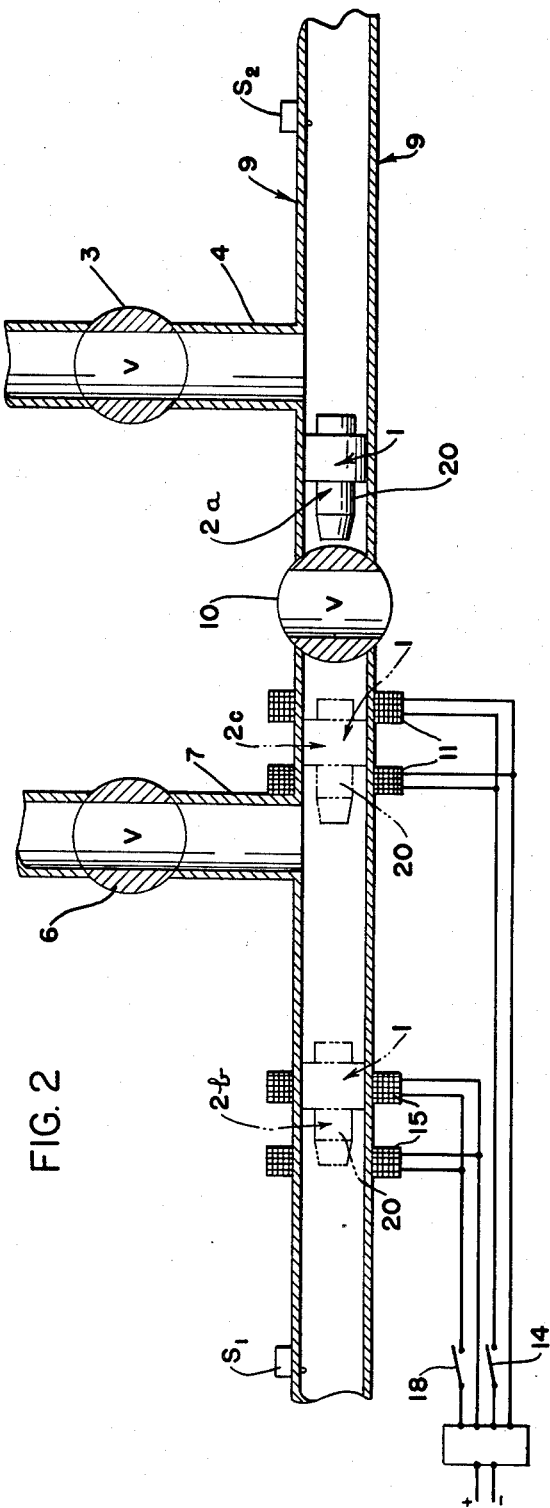
Figure 1 is a diagrammatic view showing a calibration loop.
Figure 2 is a detailed view, partly in section, of a portion of the calibrating loop with valves and the plug in position at the end of the calibrating run.

Referring now to Figure 1, a loop of pipe 9 is connected to an inlet pipe 7 in which a valve 6 is located and an outlet pipe 4 in which a valve 3 is located. A valve 10 is positioned in the loop between the inlet and outlet pipes. Switches $S_1$ and $S_2$ are located in the loop as shown and electromagnets 11 and 15, to be described in more detail later, are mounted on the pipe as illustrated.

The switches $S_1$ and $S_2$ are not a part of my invention and any known structure for these can be utilized. Generally, a small detent projects into the pipe which is tripped by the movement of the plug acting on this detent.

It will be seen that when the valve 10 is closed, and when valves 3 and 6 are open, liquid will flow in through the inlet pipe 7 around the loop 9 and back out through the outlet pipe 4. The liquid will push the plug around in the pipe, actuating switch $S_1$ which starts the beginning of the timing cycle, and actuating switch $S_2$ to complete the timing cycle. The plug will come to rest at position 2a due to loss of liquid pressure as the liquid flows out through the pipe 4. To start a new cycle the plug must be moved to a point beyond the inlet entrance into the loop, such as at position 2b. It is the means for accomplishing this movement to which the invention is directed.

Referring now to Figure 2 in which the parts are shown in more detail, the plug 1 corresponds in cross section to the interior of the pipe 9 and fits snugly therein. It may be provided with rings or other sealing means to prevent liquid from flowing past the plug. In this way, pressure applied by the liquid behind the plug will force it through the pipe. The plug is provided with a core 20 of magnetizable or magnetic material. The valve 10 is a smooth bore valve so that in open position the plug may pass through it.

A pair of electromagnets 11 surround the pipe 9 at a position in the loop between the inlet and outlets, preferably between the inlet and the valve 10. The electromagnets are preferably annular in shape and are fitted to the outside contour of the pipe and held in position by any convenient means. A second pair of electromagnets 15 is positioned between the inlet 7 and switch $S_1$. They are similarly constructed. The electromagnets 11 are connected in an electrical circuit by means of a switch 14, and the electromagnets 15 are connected in an electrical circuit by means of the switch 18. It will be seen that when either of the switches 14 or 18 is closed, the electromagnets are energized which creates a magnetic field which attracts the plug 1 because of its core 20. While I have shown the electromagnets in pairs, it will be obvious that a single electromagnet in each position can be used, or at more than two positions, and that the magnets can have various structures.

While it is contemplated that the magnets will be fixed with reference to said pipe, they may be made movable and moved along the pipe, thus moving the plug as the magnets are moved.

The pipe from which the loop 9 is formed, or at least that section of it on which the electromagnets are placed, such as that between the switches or between the end position and the starting position of the plug, is preferably formed of non-magnetic material, such as brass, or of plastic. This avoids dividing the magnetic field supplied by the electromagnets between the pipe and the plug 1, which would be the case if the pipe were formed of iron or other magnetizable material. It is preferred that the loop 9 or the section of it referred to above be formed of a transparent plastic or glass, since this permits the operator to detect the position of the plug as it is being moved by the successive sets of electromagnets.

The operation of my apparatus will now be described. It is assumed that the plug has come to rest at position 2a at the completion of the calibration run and that all of the valves are closed. When it is desired to make a new calibration run, the plug must be moved from position 2a in the loop to a point beyond the inlet, such as at position 2b. To do this, valve 10 is opened and the inlet and outlet valves 3 and 6 are closed. The electromagnets 11 are actuated by the switch 14, and the electromagnetic field pulls the plug 1 within the pipe through the valve 10 to rest at position 2c.

The valve 10 is then closed and the inlet and outlet valves 3 and 6 are then opened. As a result, liquid is flowing around through the loop but the plug remains at the position 2c because of the lack of any pressure behind it. The electromagnets 15 are next energized by means of the switch 18, and the magnetic field pulls the plug past the inlet. As soon as the plug moves past this position, it will have the liquid pressure behind it and will be propelled around through the loop. The plug will have an opportunity to gain momentum as it moves up to the position of switch $S_1$ and will be moving at the full rate of flow by the time $S_1$ is actuated. The plug will then travel around the loop until it actuates switch $S_2$, and its momentum will be sufficient to carry it past the outlet and it will come to rest at approximately position 2a.

After the valves 3 and 6 are closed, the apparatus remains inactive until it is to be used again for a calibration run.

It will be obvious that variations in the structure and the mode of operation may be made without departing from the inventive concept herein disclosed, and I intend all of the same to be within my invention as are included within the scope of the following claims.

I claim:

1. As a liquid flowmeter calibrating device, a closed continuous loop of pipe comprising a calibration loop, an inlet and an outlet connected into said calibration loop, a pipeline section between said inlet and said outlet joining said calibration loop into a continuous loop of pipe, a valve means in said pipeline section for interrupting flow in said loop of pipe, a plug device disposed within said continuous loop of pipe so as to form a liquid seal therewith, magnetic means for propelling the plug from a position within said pipeline section into the remaining portion of said continuous loop of pipe, and switch means in said calibration loop actuated by said plug as it moves through said calibration loop.

2. As a liquid flowmeter calibrating device, a closed continuous loop of pipe for calibrating flowmeters comprising a calibration loop, an inlet pipe and an outlet pipe connected into said calibration loop, a valve in said inlet pipe, a valve in said outlet pipe, a pipeline section between said inlet and said outlet joining said calibration loop into a continuous loop of pipe, a valve in said pipeline section for interrupting flow in said loop of pipe, a magnetically responsive plug device disposed within said continuous loop of pipe so as to form a liquid seal therein, magnetic means adjacent said pipeline section for propelling the plug along said pipeline section, magnetic means beyond said inlet for propelling the plug into the remaining portion of said continuous loop of pipe, and switch means in said calibration loop actuated by said plug as it moves through said calibration loop.

3. As a liquid flowmeter calibrating device, a closed continuous loop of pipe for calibrating flowmeters comprising a calibration loop, an inlet pipe and an outlet pipe connected into said calibration loop, a valve in said inlet pipe, a valve in said outlet pipe, a non-magnetic pipeline section between said inlet and said outlet joining said calibration loop into a continuous loop of pipe, a valve in said pipeline section for interrupting flow in said loop of pipe, a magnetically responsive plug device disposed within said continuous loop of pipe so as to form a liquid seal therein, magnetic means adjacent said pipeline section for propelling the plug along said pipeline section, magnetic means beyond said inlet for propelling the plug into the remaining portion of said continuous loop of pipe, and switch means in said calibration loop actuated by said plug as it moves through said calibration loop.

References Cited in the file of this patent

UNITED STATES PATENTS

| | | |
|---|---|---|
| 1,001,196 | Gilpin | Aug. 22, 1911 |
| 1,241,333 | Bowman | Sept. 25, 1917 |
| 2,218,164 | Carpenter | Oct. 15, 1940 |
| 2,812,921 | Leith | Nov. 12, 1957 |